United States Patent
Rosen

(10) Patent No.: US 8,429,613 B2
(45) Date of Patent: Apr. 23, 2013

(54) STEPPING AND APPLICATION STATE VIEWING BETWEEN POINTS

(75) Inventor: Douglas J. Rosen, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 1701 days.

(21) Appl. No.: 11/590,128

(22) Filed: Oct. 31, 2006

(65) Prior Publication Data

US 2008/0120605 A1     May 22, 2008

(51) Int. Cl.
*G06F 9/44* (2006.01)

(52) U.S. Cl.
USPC ........... 717/124; 717/125; 717/126; 717/127; 717/128; 717/129; 717/130; 717/131; 717/132; 717/133; 717/134; 717/135

(58) Field of Classification Search ........... 717/124–135
See application file for complete search history.

(56) References Cited

U.S. PATENT DOCUMENTS

| | | | |
|---|---|---|---|
| 5,124,989 A | 6/1992 | Padawer et al. | |
| 5,375,125 A | 12/1994 | Oshima et al. | |
| 5,784,552 A * | 7/1998 | Bishop et al. | 714/38 |
| 6,106,572 A | 8/2000 | Halpern | |
| 6,543,049 B1 | 4/2003 | Bates et al. | |
| 7,337,433 B2 * | 2/2008 | Cyran et al. | 717/130 |
| 7,647,631 B2 * | 1/2010 | Sima | 726/22 |
| 8,090,989 B2 * | 1/2012 | Law et al. | 717/130 |
| 2002/0087950 A1 | 7/2002 | Brodeur et al. | |
| 2002/0174415 A1 * | 11/2002 | Hines | 717/127 |
| 2004/0059809 A1 * | 3/2004 | Benedikt et al. | 709/224 |
| 2004/0064351 A1 * | 4/2004 | Mikurak | 705/7 |
| 2004/0210876 A1 * | 10/2004 | Stall et al. | 717/127 |
| 2004/0268310 A1 | 12/2004 | Morgan | |
| 2005/0108689 A1 | 5/2005 | Hooper et al. | |
| 2005/0216792 A1 | 9/2005 | Tsuboi et al. | |
| 2005/0251794 A1 * | 11/2005 | Taylor et al. | 717/125 |
| 2006/0206873 A1 * | 9/2006 | Argade | 717/135 |
| 2007/0234298 A1 * | 10/2007 | Hirai et al. | 717/124 |
| 2011/0296246 A1 * | 12/2011 | Cooper et al. | 714/38.1 |
| 2012/0089410 A1 * | 4/2012 | Mikurak | 705/1.1 |

OTHER PUBLICATIONS

Bill Lewis, "Debugging Backwards in Time", Oct. 2003, Fifth Int. Workshop on Automated and Algorithmic Debugging, p. 225-235.*
Yasushi Saito, et al., "Jockey: A User-space Library for Record-replay Debugging", Sep. 2005, AADEBUG '05, p. 69-76.*

(Continued)

*Primary Examiner* — Wei Zhen
*Assistant Examiner* — Junchun Wu
(74) *Attorney, Agent, or Firm* — L. Alan Collins; Collins & Collins Intellectual, LLC

(57) ABSTRACT

Various technologies and techniques are disclosed for providing stepping and state viewing in a debugger application. A start and end breakpoint are assigned. Source code execution begins, and upon reaching the start breakpoint, a logging feature begins storing one or more values that may be impacted upon execution of code between the start breakpoint and an end breakpoint. More lines of source code are executed until the end breakpoint is reached. When the end breakpoint is reached, the debugger is put into break mode. While in break mode, a playback feature is provided to allow a user to play back a path of execution that occurred between the start breakpoint and the end breakpoint. The playback feature uses at least some of the values that were stored with the logging feature to show how each referenced variable changed in value.

14 Claims, 7 Drawing Sheets

OTHER PUBLICATIONS

Bob Boothe, "Efficient Algorithms for Bidirectional Debugging", 2000, ACM.*

Thomas Moher, "PROVIDE: A Process Visualization and Debugging Environment", IEEE, Jun. 1988, vol. 14 No. 6, 1988.*

Agrawal et al., "An Execution, Backtracking Approach to Debugging", Date: 1991, http://ieeexplore.ieee.org/iel1/52/2900/00088940.pdf?isNumber=.

Boothe, Bob, "A Fully Capable Bidirectional Debugger", Date: Jan. 2001, p. 36, vol. 25, No. 1, http://delivery.acm.org/10.1145/350000/340867/p36-booth.pdf?ip=151.207.250.11&acc=ACTIVE%20SERVICE&CFID=176512480&CFTOKEN=89876640&_acm_=1359668610_39700f81d52c741be9c7739fd263b725.

Boothe, Bob, "Efficient Algorithms for Bidirectional Debugging", Date: 2000, http://suif.stanford.edu/~courses/cs343/papers/boothe.pdf.

* cited by examiner

STEPPING AND APPLICATION STATE VIEWING BETWEEN POINTS

BACKGROUND

Most software development tools such as MICROSOFT® Visual Studio have debuggers that allow the software developer to debug the code and enter break mode at a particular point in time to watch the code execution more carefully to locate an error. When a debugger breaks into the code in break mode when an exception occurs, it is not very easy to determine what caused the exception because the changes to the data and the path of execution through the application are not remembered by the debugger or the platform. Some debuggers have attempted to solve this problem by just recording every activity that happens during execution, such as recording every data value as it changes and the entire execution path. The problem with such an approach is that there is a huge overhead involved in recording every activity for an entire application as the values change and as every execution path is taken.

SUMMARY

Various technologies and techniques are disclosed for providing stepping and state viewing in a debugger application. A start breakpoint and an end breakpoint are assigned, such as by a user and/or programmatically. Source code execution begins, and upon reaching the start breakpoint, a logging feature begins storing one or more values that may be impacted upon execution of code between the start breakpoint and an end breakpoint. More lines of source code are executed until the end breakpoint is reached. When the end breakpoint is reached, the debugger is put into break mode. In one implementation, the logging feature stops logging when break mode is entered.

While in break mode, a playback feature is provided to allow a user to play back a path of execution that occurred between the start breakpoint and the end breakpoint. The playback feature uses at least some of the values that were stored with the logging feature to show how each referenced variable changed in value. In one implementation, the playback is bidirectional, allowing the user to move forward and/or backward in time to play back how the values and/or state of the application changed. In one implementation, as playback occurs, the user is able to see the current and ending values of each referenced variable, such as in a locals window.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
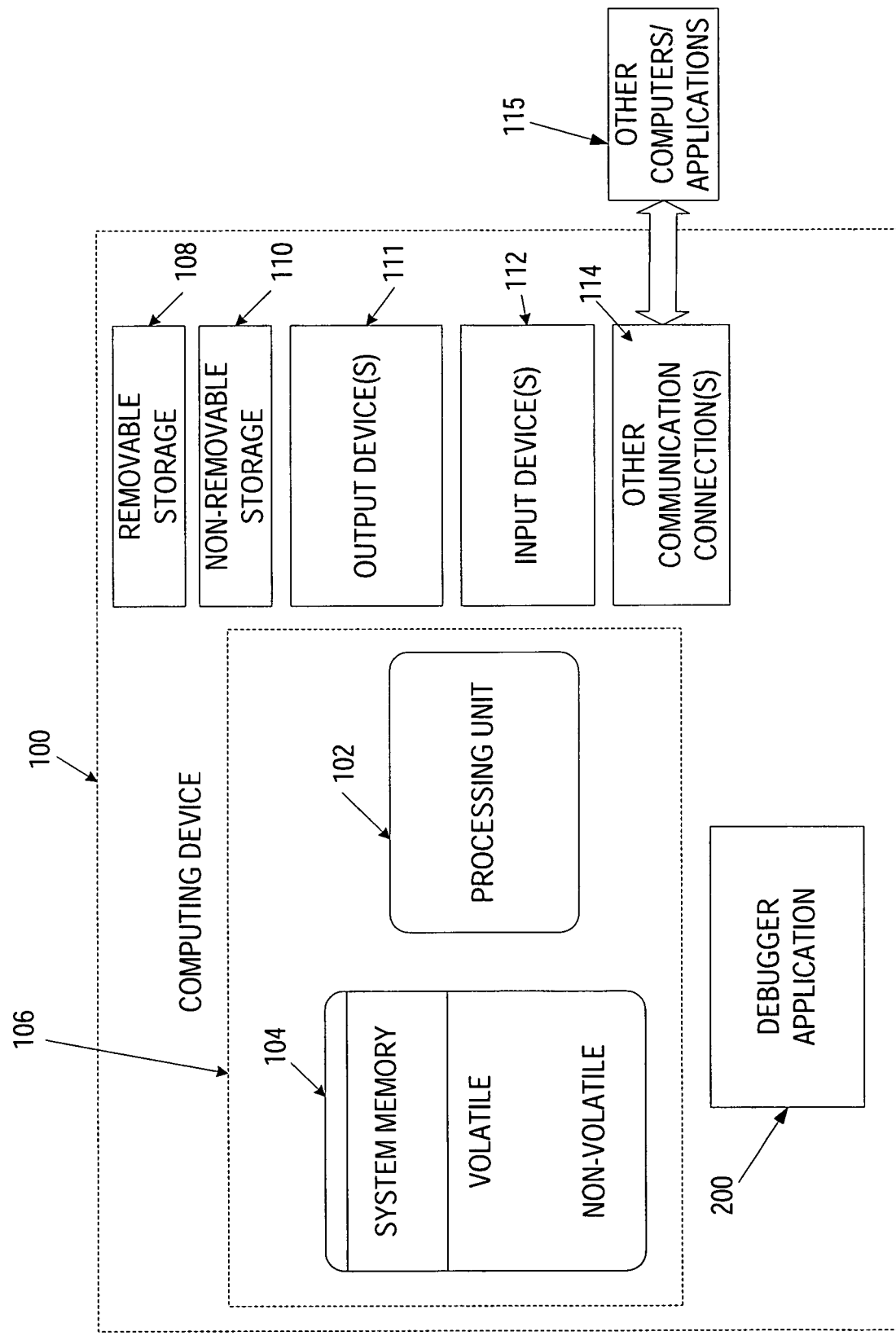
FIG. 1 is a diagrammatic view of a computer system of one implementation.

For the purposes of promoting an understanding of the principles of the invention, reference will now be made to the embodiments illustrated in the drawings and specific language will be used to describe the same. It will nevertheless be understood that no limitation of the scope is thereby intended. Any alterations and further modifications in the described embodiments, and any further applications of the principles as described herein are contemplated as would normally occur to one skilled in the art.

The system may be described in the general context as a software development application that provides debugging features, but the system also serves other purposes in addition to these. In one implementation, one or more of the techniques described herein can be implemented as features within a software development program such as MICROSOFT® Visual Studio, or from any other type of program or service that allows for debugging the operation of software. A start breakpoint and an end breakpoint are assigned, such as by a user and/or programmatically. Source code execution begins, and upon reaching the start breakpoint, a logging feature begins storing one or more values that may be impacted upon execution of code between the start breakpoint and an end breakpoint, along with the source locations visited. The phrase "values that may be impacted" as used herein is meant to include any values or states that could be touched and/or changed by code that executes between the start breakpoint and end breakpoint (whether or not the value or state actually changed). Non-limiting examples of "values that may be impacted" include referenced variables in a particular function. The phrase "source location" is meant to include all the source locations visited during the execution of the application between the start and end breakpoint, regardless of whether or not a variable change takes place at that location. These source locations are then used to assist in playing back a path of execution later. More lines of source code are executed until the end breakpoint is reached. When the end breakpoint is reached, the debugger is put into break mode. While in break mode, a playback feature is provided to allow a user to play back the path of execution that occurred between the start breakpoint and the end breakpoint, and/or to view how the referenced variable values changed.

As shown in FIG. 1, an exemplary computer system to use for implementing one or more parts of the system includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106.

Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Computing device 100 includes one or more communication connections 114 that allow computing device 100 to communicate with other computers/applications 115. Device 100 may also have input device(s) 112 such as keyboard, mouse, pen, voice input device, touch input device, etc. Output device(s) 111 such as a display, speakers, printer, etc. may also be included. These devices are well known in the art and need not be discussed at length here. In one implementation, computing device 100 includes debugger application 200. Debugger application 200 will be described in further detail in FIG. 2.

Figure 2:
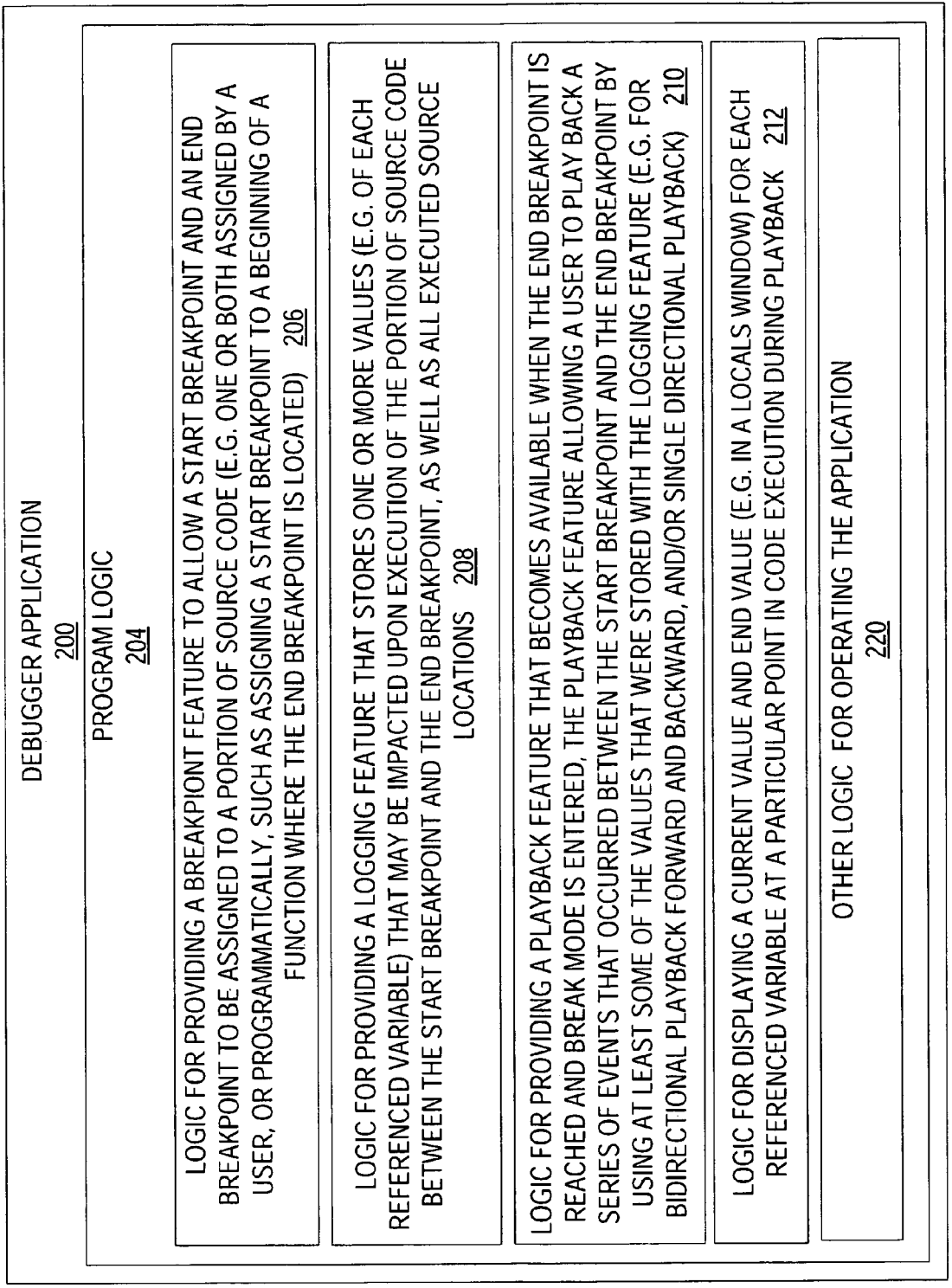
FIG. 2 is a diagrammatic view of a debugger application of one implementation operating on the computer system of FIG. 1.

Turning now to FIG. 2 with continued reference to FIG. 1, debugger application 200 operating on computing device 100 is illustrated. Debugger application 200 is one of the application programs that reside on computing device 100. However, it will be understood that debugger application 200 can alternatively or additionally be embodied as computer-executable instructions on one or more computers and/or in different variations than shown on FIG. 1. Alternatively or additionally, one or more parts of debugger application 200 can be part of system memory 104, on other computers and/or applications 115, or other such variations as would occur to one in the computer software art.

Debugger application 200 includes program logic 204, which is responsible for carrying out some or all of the techniques described herein. Program logic 204 includes logic for providing a breakpoint feature to allow a start breakpoint and an end breakpoint to be assigned to a portion of source code (e.g. one or both assigned by a user, or programmatically, such as assigning a start breakpoint to a beginning of a function where the end breakpoint is located) 206; logic for providing a logging feature that stores one or more values (e.g. of each referenced variable) that may be impacted upon execution of the portion of source code between the start breakpoint and the end breakpoint, as well as all executed source locations 208; logic for providing a playback feature that becomes available when the end breakpoint is reached and break mode is entered, the playback feature allowing a user to play back a path of execution that occurred between the start breakpoint and the end breakpoint by using at least some of the values that were stored with the logging feature (e.g. for bidirectional playback forward and backward, and/or single directional playback) 210; logic for displaying a current value and an end value (e.g. in a locals window) for each referenced variable at a particular point in code execution during playback 212; and other logic for operating the application 220. In one implementation, program logic 204 is operable to be called programmatically from another program, such as using a single call to a procedure in program logic 204.

Figure 3:
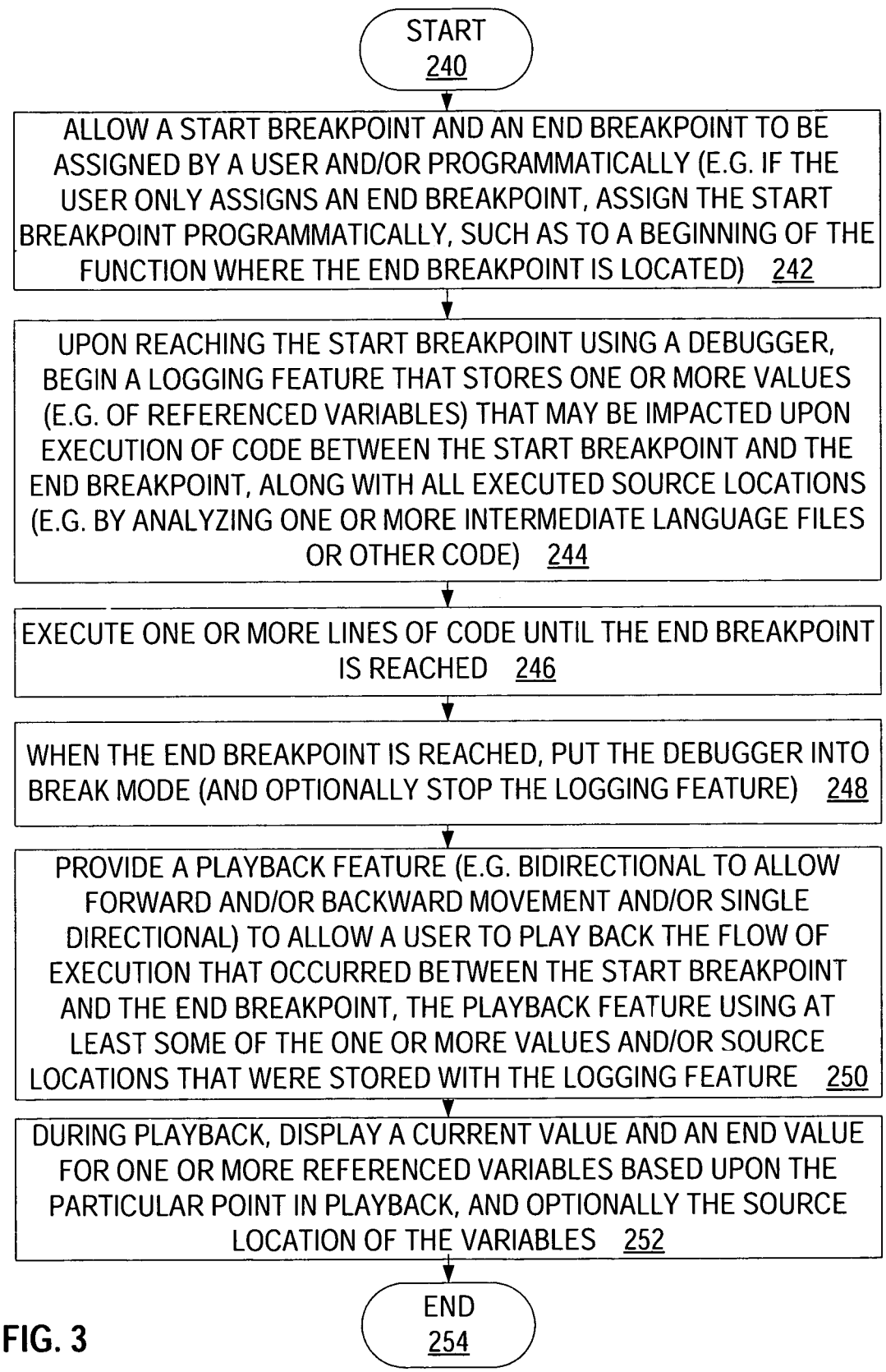
FIG. 3 is a process flow diagram for one implementation of the system of FIG. 1 illustrating the stages involved in providing a stepping and state viewing debugger.
Figure 4:
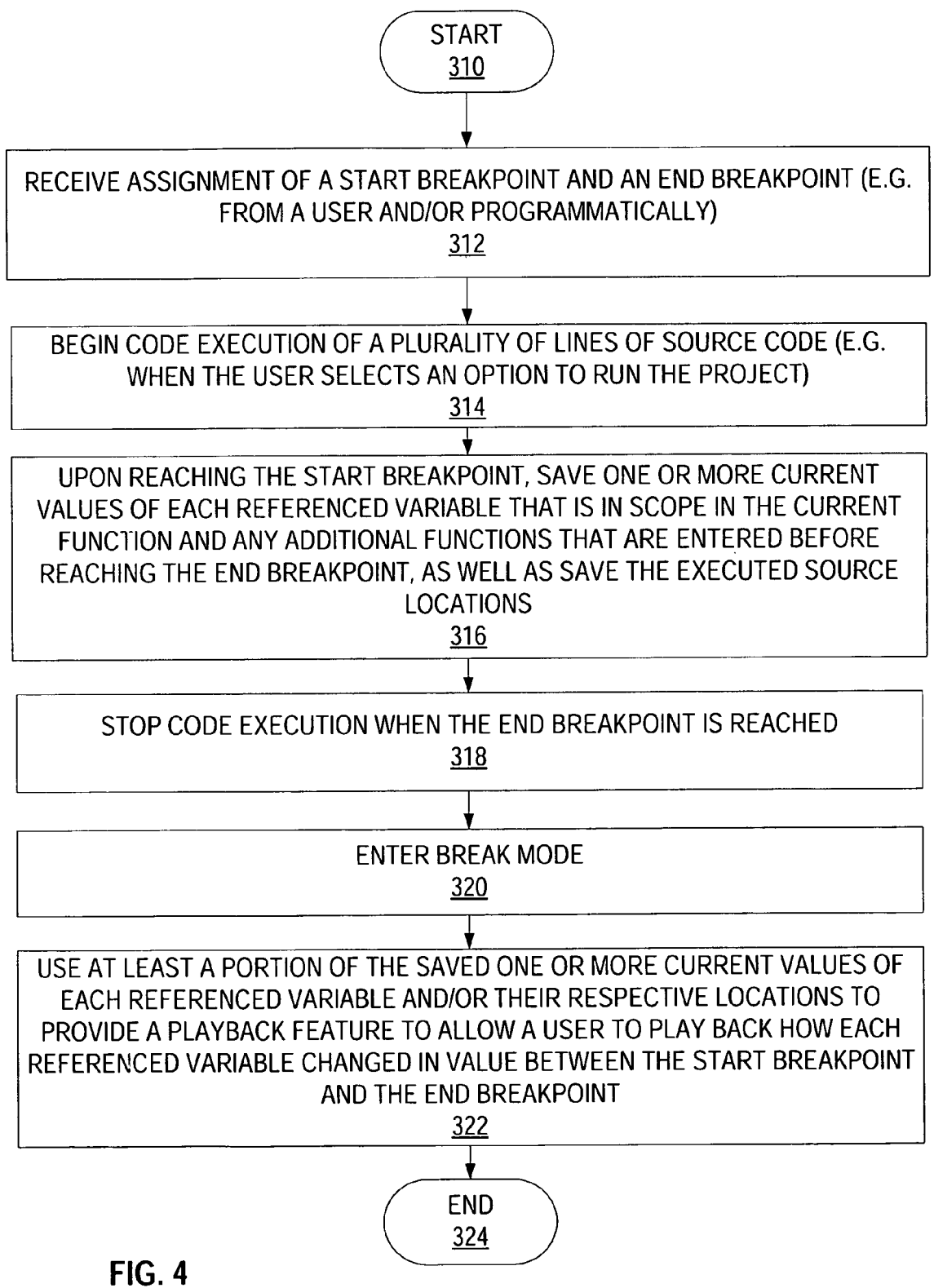
FIG. 4 is a process flow diagram for one implementation of the system of FIG. 1 illustrating the stages involved in using the stepping and state viewing debugger to debug an application.
Figure 5:
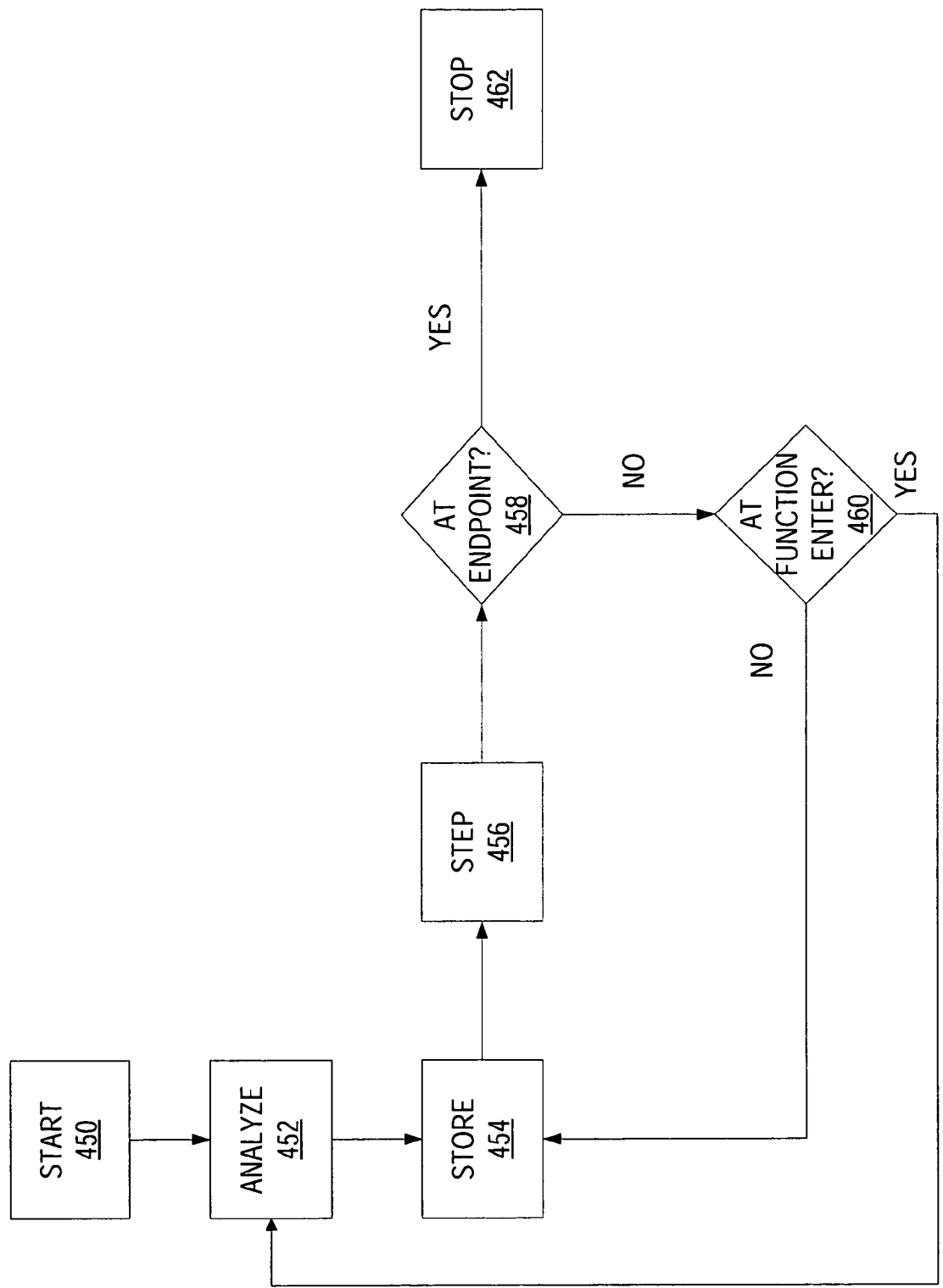
FIG. 5 is a process flow diagram for one implementation of the system of FIG. 1 illustrating the stages involved in providing the logging feature for analyzing and recording values and the source locations visited between the start and end breakpoints.

Turning now to FIGS. 3-5 with continued reference to FIGS. 1-2, the stages for implementing one or more implementations of debugger application 200 are described in further detail. FIG. 3 is a process flow diagram for debugger application 200 illustrating the stages involved in providing a stepping and state viewing debugger. In one form, the process of FIG. 3 is at least partially implemented in the operating logic of computing device 100. The procedure begins at start point 240 with allowing a start breakpoint and an end breakpoint to be assigned by a user and/or programmatically (e.g. if the user only assigns an end breakpoint, assign the start breakpoint programmatically, such as to a beginning of the function where the end breakpoint is located) (stage 242). Upon reaching the start breakpoint using a debugger, begin a logging feature that stores one or more values (such as referenced values) that may be impacted upon execution of code between the start breakpoint and the end breakpoint, along with all executed source locations (stage 244). A few non-limiting examples of referenced values that may be impacted include local variables in scope and/or each variable reference present in a current function. In one implementation, one or more intermediate language files or other code or other code are analyzed to help determine which values may change (stage 244). One or more lines of code are executed until the end breakpoint is reached (stage 246).

When the end breakpoint is reached, the debugger is put into break mode (and optionally stop the logging feature) (stage 248). A playback feature (e.g. bidirectional to allow forward and/or backward movement, and/or single directional) is provided to allow a user to play back a path of execution that occurred between the start breakpoint and the end breakpoint (stage 250). In one implementation, a start option, stop option, and slider option are used to control this playback in one or more directions. The playback feature uses at least some of the one or more values and/or the executed source locations that were stored with the logging feature (stage 250). During playback, a current value and an ending value are displayed, such as in a locals window, for one or more referenced variables based upon the particular point in playback (stage 252). In one implementation, the source location of each of the one or more referenced variables is also displayed (stage 252). The process ends at end point 254.

FIG. 4 illustrates one implementation of the stages involved in using the stepping and state viewing debugger to debug an application. In one form, the process of FIG. 4 is at least partially implemented in the operating logic of computing device 100. The procedure begins at start point 310 with receiving assignment of a start breakpoint and an end breakpoint (e.g. from a user and/or programmatically) (stage 312). Code execution is started for a plurality of lines of source code (e.g. when the user selects an option to run the project) (stage 314). Upon reaching the start breakpoint, one or more current values are saved for each referenced variable that is in scope in the current function and any additional functions that are entered before reaching the end breakpoint (stage 316). The executed source locations are also saved (stage 316). Code execution is stopped when the end breakpoint is reached (stage 318), and break mode is then entered (stage 320). Using at least a portion of the saved one or more current values of each referenced variable and/or the executed source locations, a playback feature is provided to allow a user to play back how each referenced variable changed in value between the start breakpoint and the end breakpoint (e.g. forward and/or backward) (stage 322). The process ends at end point 324.

FIG. 5 illustrates one implementation of the stages involved in providing the logging feature to analyze and record values between the start and end breakpoints. In one form, the process of FIG. 5 is at least partially implemented in the operating logic of computing device 100. The procedure begins at start point 450 with the code execution reaching the start breakpoint. The intermediate language code of the current function is analyzed (stage 452). The intermediate language is scanned for any field references, which are stored (stage 454). Any referenced variables that are in scope are inspected to get their values and are stored along with the values of the previously discovered field references (stage 454). In one implementation, one goal is to store only the values of those variables that may be touched by the code to be executed, as opposed to a complete dump of the heap.

A source level step is then executed (stage 456) to execute the next line of source code. When the step completes, the debugger application 200 checks to see if the instruction pointer is at the end breakpoint (decision point 458). If the instruction pointer is not at the end breakpoint (decision point 458), then the debugger application 200 checks to see if another function was entered. If another function was entered (decision point 460), then the intermediate language code of the current function is analyzed (stage 452) and the field reference values and referenced variable values are stored (stage 454). Another step is then taken to execute the next line of source code (stage 456). If another function was not entered (decision point 460), then the referenced variables that are in scope along with the current values for the field references are stored (stage 454). Once the instruction pointer is at the end breakpoint (decision point 458), then the system is put into break mode (stage 462) and the process ends.

Figure 6:
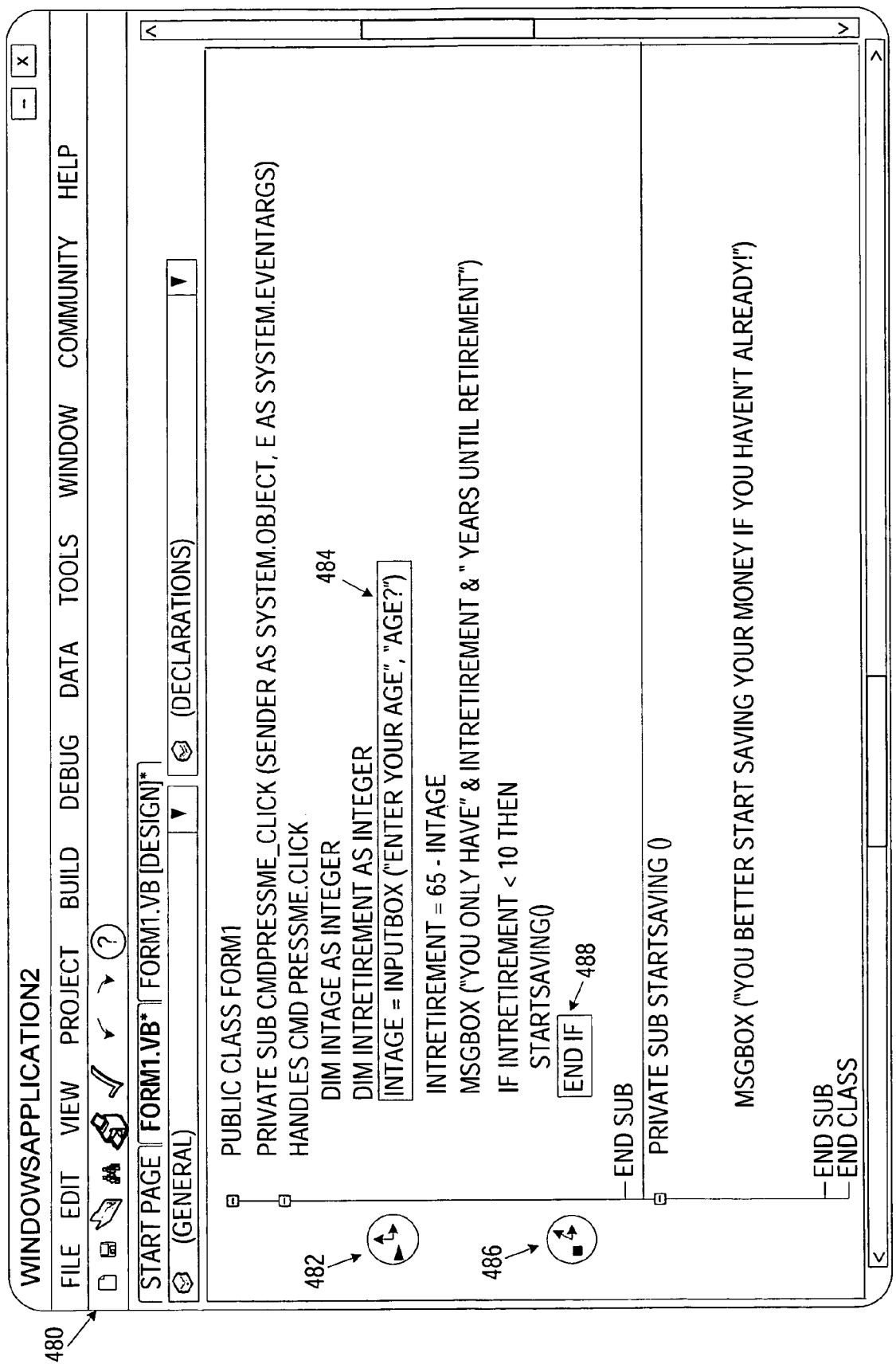
FIG. 6 is a simulated screen for one implementation of the system of FIG. 1 that illustrates setting start and end breakpoints in a debugger.
Figure 7:
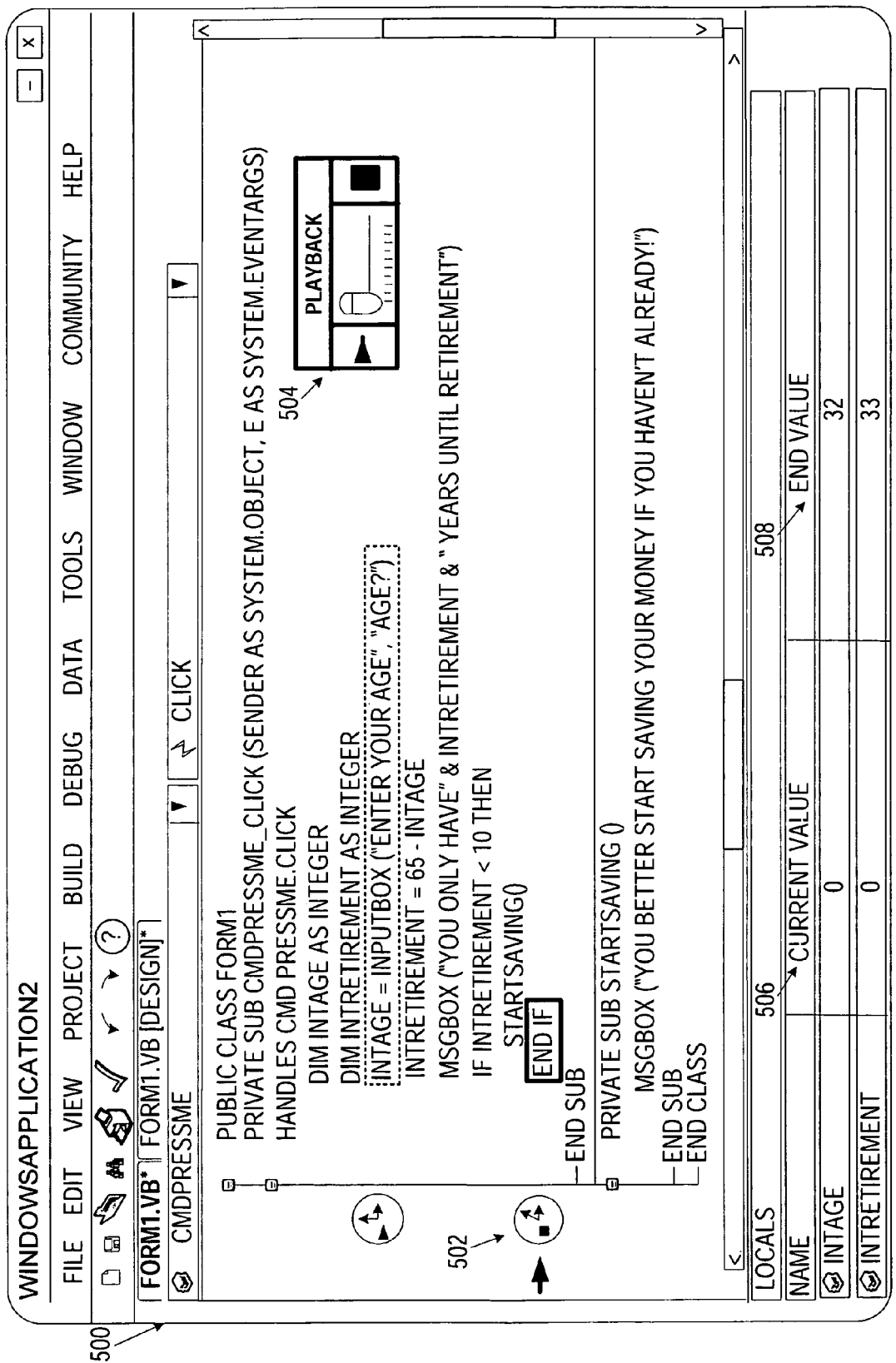
FIG. 7 is a simulated screen for one implementation of the system of FIG. 1 that illustrates entering debug mode upon hitting a start breakpoint.

Turning now to FIGS. 6 and 7, simulated screens are shown to illustrate the stepping and state viewing of debugger application 200 as described in FIGS. 2-5 in further detail. FIG. 6 is a simulated screen 480 for one implementation of the system of FIG. 1 that illustrates setting start and end breakpoints in a debugger. Start breakpoint 482 has been assigned to code line 484, and end breakpoint 486 has been assigned to code line 488. Turning now to FIG. 7, simulated screen 500 illustrates that when end breakpoint 502 (486 on FIG. 6) is reached, debugger application 200 breaks into debug mode. Using the playback toolbar 504, the user can then specify to start or stop the playback, as well as to jump forward or backward in the execution timeline (e.g. using the slider or other feature). As the playback is manipulated, the locals window displays the current value 506 and the end value 508 for each of the referenced variables. This allows the user to see what the current value for the variable based on the current line of code being executed, and what that value was when the function ended. In one implementation, the locals window also displays where in the source code the program was at that point in time (e.g. the respective source location of the particular referenced variable).

In one implementation, by using the playback feature, the user can move the instruction pointer back in time to see the execution path through the function and see the values of important data and how it changed as execution occurred. In one implementation, by only saving the values that the user has deemed interesting (e.g. those affected between the start and end breakpoints), a reasonable level of performance is achieved while allowing the user to have more helpful debugging features.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the client and/or server arrangements, user interface screen content, and/or data layouts as described in the examples discussed herein could be organized differently on one or more computers to include fewer or additional options or features than as portrayed in the examples.

What is claimed is:

1. A method for providing stepping and state viewing in a portion of code via a debugger, the method comprising:
   setting, via the debugger, a start breakpoint and an end breakpoint in a portion of code;
   executing the portion of code from at least the start breakpoint;
   logging, starting at the start breakpoint set in the executing portion of code, values of variables in scope of the portion of code whether or not the values are changed as a result of the executing;
   breaking the execution at the end breakpoint set in the executing portion of code resulting in an executed and logged portion of code from the start breakpoint up to the end breakpoint; and
   providing, in response to the breaking, the stepping and state viewing in the form of a bi-directional playback feature configured to play back a path of the executed and logged portion of code, and further configured to show to a user via the bi-directional playback feature the logged values of the variables at each point of execution of the executed and logged portion of code;
   wherein the method is performed by a computing device.

2. The method of claim 1, wherein the bi-directional playback feature is further configured to show to the user an end value of at least one of the values and a current value of the at least one of the values, wherein the end value corresponds to the end breakpoint, and wherein the current value corresponds to a current point in the path.

3. The method of claim 1 further comprising turning off the logging in response to the end breakpoint being reached by the executing.

4. The method of claim 1, wherein the start breakpoint and the end breakpoint are set by a user.

5. The method of claim 1, wherein the start breakpoint is set programmatically after a user sets the end breakpoint.

6. The method of claim 5, wherein the start breakpoint is set programmatically at the beginning of a function that includes the end breakpoint.

7. The method of claim 1, wherein the logging includes analyzing one or more intermediate language files to help determine the variables in the scope of the portion of code.

8. The method of claim 1, wherein the bi-directional playback feature is further configured to allow a user to step forward and backward through points of execution between the start breakpoint and the end breakpoint of the executed and logged portion of code.

9. At least one computer-readable storage medium that is not a signal or carrier wave per se having computer-executable instructions that, when executed by a computer, cause the computer to perform a method comprising:
   setting, via a debugger, a start breakpoint and an end breakpoint in a portion of code;

executing the portion of code from at least the start breakpoint;

logging, starting at the start breakpoint set in the executing portion of code, values of variables in scope of the portion of code whether or not the values are changed as a result of the executing;

breaking the execution at the end breakpoint set in the executing portion of code resulting in an executed and logged portion of code from the start breakpoint up to the end breakpoint; and providing, in response to the breaking, the stepping and state viewing in the form of a bi-directional playback feature configured to play back a path of the executed and logged portion of code, and further configured to show to a user via the bi-directional playback feature the logged values of the variables at each point of execution of the executed and logged portion of code.

10. The at least one computer-readable storage medium of claim 9, wherein the start breakpoint and the end breakpoint are set by a user.

11. The at least one computer-readable storage medium of claim 9, wherein the start breakpoint is set programmatically after a user sets the end breakpoint.

12. The at least one computer-readable storage medium of claim 11, wherein the start breakpoint is set programmatically to a beginning section of a function comprising the end breakpoint.

13. The at least one computer-readable storage medium of claim 9, wherein the playback feature is further configured to allow a user to step forward and backward through points of execution between the start breakpoint and the end breakpoint of the executed and logged portion of code.

14. A system comprising:

a breakpoint feature configured for setting, via a debugger, a start breakpoint and an end breakpoint in a portion of code;

a computing device configured for executing the portion of code from at least the start breakpoint;

a logging feature configured for logging, starting at the start breakpoint set in the executing portion of code, values of variables in scope of the portion of code whether or not the values are changed as a result of the executing;

the breakpoint feature further configured for breaking the execution at the end breakpoint set in the executing portion of code resulting in an executed and logged portion of code from the start breakpoint up to the end breakpoint; and a bi-directional playback feature configured to operate on the computing device and configured to playback, in response to the breaking, a path of the executed and logged portion of code, and further configured to show to a user the logged values of the variables at each point of execution of the executed and logged portion of code.

* * * * *